US 8,970,929 B2

(12) United States Patent
Mukai et al.

(10) Patent No.: US 8,970,929 B2
(45) Date of Patent: *Mar. 3, 2015

(54) IMAGE READING APPARATUS

(71) Applicant: Brother Kogyo Kabushiki Kaisha, Nagoya-shi, Aichi-ken (JP)

(72) Inventors: Takaaki Mukai, Iwakura (JP); Yoshiki Yano, Moriyama (JP); Tatsuya Sato, Ichinomiaya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,790

(22) Filed: Jun. 28, 2013

(65) Prior Publication Data
US 2014/0071503 A1    Mar. 13, 2014

(30) Foreign Application Priority Data
Sep. 7, 2012   (JP) ................. 2012-196769

(51) Int. Cl.
H04N 1/04      (2006.01)
G06F 15/00     (2006.01)
A47B 81/00     (2006.01)
H04N 1/00      (2006.01)

(52) U.S. Cl.
CPC ....... H04N 1/00604 (2013.01); H04N 1/00567 (2013.01)
USPC ............ 358/498; 358/482; 358/1.5; 358/474; 312/223.1

(58) Field of Classification Search
USPC ............... 358/498, 482, 1.5, 474; 312/223.1
See application file for complete search history.

(56) References Cited

U.S. PATENT DOCUMENTS

| | | | |
|---|---|---|---|
| 8,144,373 B2 * | 3/2012 | Tomoda et al. | 358/474 |
| 8,233,202 B2 * | 7/2012 | Chen et al. | 358/498 |
| 8,305,659 B2 * | 11/2012 | Chen | 358/498 |
| 8,446,651 B2 * | 5/2013 | Murosaki | 358/498 |
| 2005/0057785 A1 | 3/2005 | Endo | |

(Continued)

FOREIGN PATENT DOCUMENTS

| | | |
|---|---|---|
| JP | H09-284478 A | 10/1997 |
| JP | 2005-051313 A | 2/2005 |

(Continued)

OTHER PUBLICATIONS

Extended European Search Report for EP Application No. 13173804.9 mailed Oct. 29, 2014 (11 pages).

Primary Examiner — Charlotte M Baker
Assistant Examiner — Rury Grisham
(74) Attorney, Agent, or Firm — Merchant & Gould PC

(57) ABSTRACT

An image reading apparatus includes a housing, a tray, a conveyer, an image reader, a position detector, and a controller. The housing has a first introduction opening, a first discharge opening, a second introduction opening, and a second discharge opening. The tray is configured to connect to the housing movably between an open position and a close position relative to the housing. The tray is configured to cover the first introduction opening and to expose the second introduction opening and the second discharge opening at the close position. The conveyer is configured to convey the second medium from the second introduction opening to the second discharge opening. The conveyer is provided in the housing. The controller is configured to drive the conveyer when the tray is located at the close position.

20 Claims, 9 Drawing Sheets

(56) References Cited

U.S. PATENT DOCUMENTS

| | | |
|---|---|---|
| 2008/0259414 A1 | 10/2008 | Kitagawa et al. |
| 2008/0285097 A1 | 11/2008 | Kitagawa et al. |
| 2012/0105925 A1* | 5/2012 | Shirai et al. ............... 358/498 |
| 2014/0091687 A1* | 4/2014 | Kawauchi ................ 312/223.1 |
| 2014/0092401 A1* | 4/2014 | Nakayama ................. 358/1.5 |
| 2014/0092451 A1* | 4/2014 | Mizuno ..................... 358/498 |
| 2014/0092454 A1* | 4/2014 | Nakayama et al. ........ 358/498 |
| 2014/0092456 A1* | 4/2014 | Ukai .......................... 358/498 |
| 2014/0153065 A1* | 6/2014 | Mori .......................... 358/482 |

FOREIGN PATENT DOCUMENTS

| | | |
|---|---|---|
| JP | 2008-270954 A | 11/2008 |
| JP | 2008-285259 A | 11/2008 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |

* cited by examiner

IMAGE READING APPARATUS

CROSS-REFERENCE TO RELATED APPLICATION

This application claims priority from Japanese Patent Application No. 2012-196769 filed on Sep. 7, 2012, the entire subject matter of which is incorporated herein by reference.

TECHNICAL FIELD

This disclosure relates to an image reading apparatus.

BACKGROUND

For example, an image reading apparatus includes a housing, a feeding tray, a conveyance unit and a reading unit.

The housing is formed with a first introduction opening, a first discharge opening, a first conveyance path, a second introduction opening, a second discharge opening and a second conveyance path. The first introduction opening is configured to introduce therein a first medium. The first discharge opening is configured to discharge the first medium therethrough. The first conveyance path is configured to guide the first medium from the first introduction opening to the first discharge opening. The second introduction opening is configured to introduce therein a second medium having a width narrower than that of the first medium. The second discharge opening is configured to discharge the second medium therethrough. The second conveyance path is configured to guide the second medium from the second introduction opening to the second discharge opening.

The feeding tray is configured to put thereon the first medium so that it can be introduced into the first introduction opening at an open state thereof.

The conveyance unit is provided in the housing and is configured to convey the second medium, which has been introduced into the second introduction opening, on the second conveyance path.

The reading unit is provided in the housing and is configured to read an image of the first image that is conveyed on the first conveyance path. Also, the reading out is configured to read an image of the second medium that is conveyed on the second conveyance path.

In the image reading apparatus, the first medium introduced into the first introduction opening is conveyed on the first conveyance path. Then, the reading unit reads the image of the first medium that is conveyed on the first conveyance path. Also, in the image reading apparatus, the second medium introduced into the second introduction opening is conveyed on the second conveyance path. Then, the reading unit reads the image of the second medium that is conveyed on the second conveyance path.

SUMMARY

According to the image reading apparatus described above, the feeding tray is required so as to convey the first medium but is not necessarily required so as to convey the second medium. Nevertheless, according to the above-image reading apparatus, it is not possible to convey the second medium on the second conveyance path unless the feeding tray is opened. Therefore, according to the image reading apparatus, when reading the image of the second medium, it is required to open the feeding tray, so that the improvement on the convenience is needed.

In view illustrating the above, this disclosure provides at least an image reading apparatus capable of improving the convenience thereof.

An aspect of an image reading apparatus of this disclosure may include a housing, a tray, a conveyer, an image reader, a position detector, and a controller. The housing may have a first introduction opening having a first length in a first direction and being configured to receive a first medium, a first discharge opening configured to discharge the first medium therethrough, a second introduction opening having a second length in the first direction and being configured to receive a second medium, the second length being shorter than the first length, and a second discharge opening configured to discharge the second medium therethrough. The tray may be configured to connect to the housing movably between an open position and a close position relative to the housing. The tray may be configured to receive the first medium at the open position. The tray may be configured to cover the first introduction opening and to expose the second introduction opening and the second discharge opening at the close position. The conveyer may be configured to convey the second medium from the second introduction opening to the second discharge opening. The conveyer may be provided in the housing. The image reader may be configured to read an image of the first medium that is conveyed from the first introduction opening to the first discharge opening and to read an image of the second medium that is conveyed from the second introduction opening to the second discharge opening. The image reader may be provided in the housing. The position detector may be configured to detect a position of the tray relative to the housing. The controller may be configured to determine whether the tray is located at the close position based on the detection result received from the position detector. The controller may be configured to drive the conveyer when the controller has determined that the tray is located at the close position.

Another aspect of an image reading apparatus of this disclosure may include: a housing, a tray, a conveyer, and an image reader. The housing may have a first introduction opening having a first length in a first direction and being configured to receive a first medium, a first discharge opening configured to discharge the first medium therethrough, a second introduction opening having a second length in the first direction and being configured to receive a second medium, the second length being shorter than the first length, and a second discharge opening configured to discharge the second medium therethrough. The tray may be configured to connect to the housing rotatably about a rotation axis relative to the housing between an open position and a close position. The tray may include a first tray and a second tray. One side of the first tray may be configured to connect to the housing rotatably about the rotation axis. The second tray may be configured to connect to the other side of the first tray rotatably about another rotation axis. The conveyer may be configured to convey the second medium from the second introduction opening to the second discharge opening. The conveyer may be provided in the housing. The image reader may be configured to read an image of the first medium that is conveyed from the first introduction opening to the first discharge opening and to read an image of the second medium that is conveyed from the second introduction opening to the second discharge opening. The image reader may be provided in the housing. The first discharge opening and at least one of the second introduction opening and the second discharge opening may be provided on one surface of the housing. The first tray may be configured to receive the first medium when the tray is located at the open position, and may be configured to cover the first introduction opening when the tray is located at the close position. The second tray may be configured to receive the first medium when the tray is located at the open position, and may be configured to expose the at least one of the second introduction opening and the second discharge opening when the tray is located at the close position.

Yet another aspect of an image reading apparatus of this disclosure may include: a housing, a feeding tray, a conveyer, an image reader, and an operation device. The housing may have a first introduction opening having a first length in a first direction and being configured to receive a first medium, a first discharge opening configured to discharge the first medium therethrough, a second introduction opening having a second length in the first direction and being configured to receive a second medium, the second length being shorter than the first length, and a second discharge opening configured to discharge the second medium therethrough. The tray may be configured to connect to the housing movably between an open position and a close position relative to the housing. The tray may be configured to receive the first medium at the open position. The tray may be configured to cover the first introduction opening and to expose the second introduction opening and the second discharge opening at the close position. The conveyer may be configured to convey the second medium from the second introduction opening to the second discharge opening. The conveyer may be provided in the housing. The image reader may be configured to read an image of the first medium that is conveyed from the first introduction opening to the first discharge opening and to read an image of the second medium that is conveyed from the second introduction opening to the second discharge opening. The image reader may be provided in the housing. The operation device may be provided on one surface of the housing. The tray may be configured to cover the one surface of the housing at the close position. The tray may have an opening that is configured to expose the operation device to the outside when the tray is located at the close position.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, first to fourth illustrative configurations of this disclosure will be described with reference to the drawings.

(First Illustrative Configuration)

Figure 1:
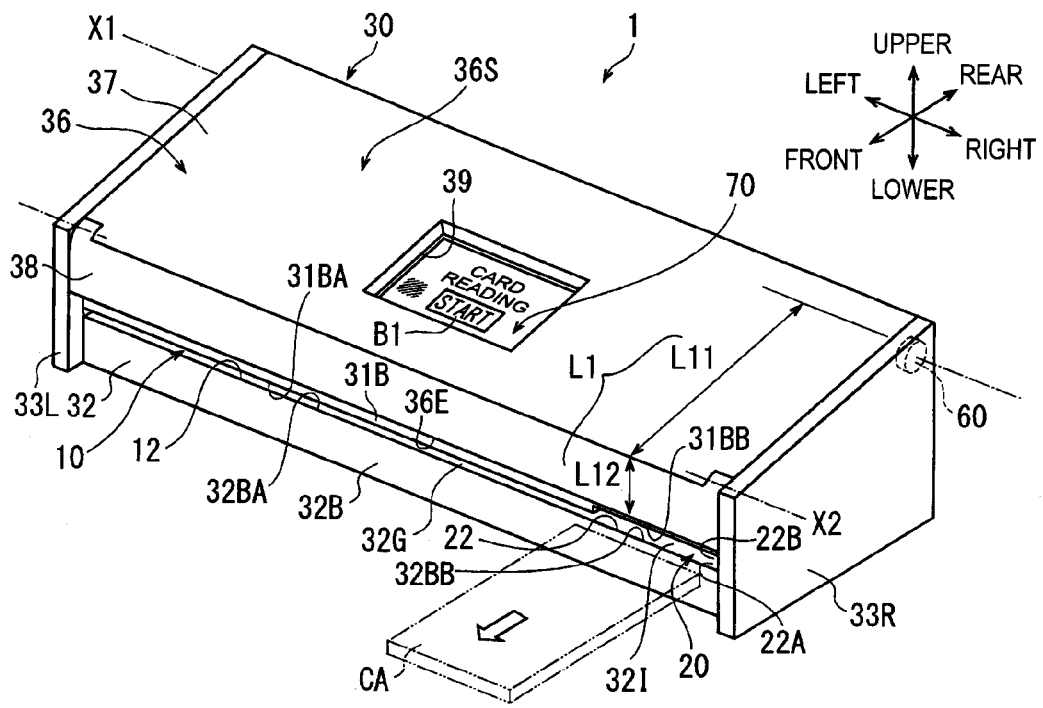
FIG. 1 is a front perspective view illustrating an image reading apparatus according to a first illustrative configuration implementing the image reading apparatus of this disclosure.

As shown in FIG. 1, an image reading apparatus 1 of a first illustrative configuration is an example of a specific aspect of the image reading apparatus of this disclosure. In FIG. 1, respective directions of front, rear, left, right, upper and lower are indicated by defining a side of a first discharge opening 12 as an apparatus front side and a side that is located at a left side when it is opposed to the first discharge opening 12 as a left side. The respective directions shown in FIGS. 2 to 12 are indicated in correspondence to the respective directions shown in FIG. 1. In the below, respective elements of the image reading apparatus 1 are descried with reference to FIG. 1 and so on.

As shown in FIGS. 1 to 7, the image reading apparatus 1 has a housing 30, a feeding tray 36, a power supply unit 59, a control circuit 54, a conveyance unit 40, a reading unit 55, a touch panel 70, an open/close position sensor 60 and a card sensor 62.

Figure 3:
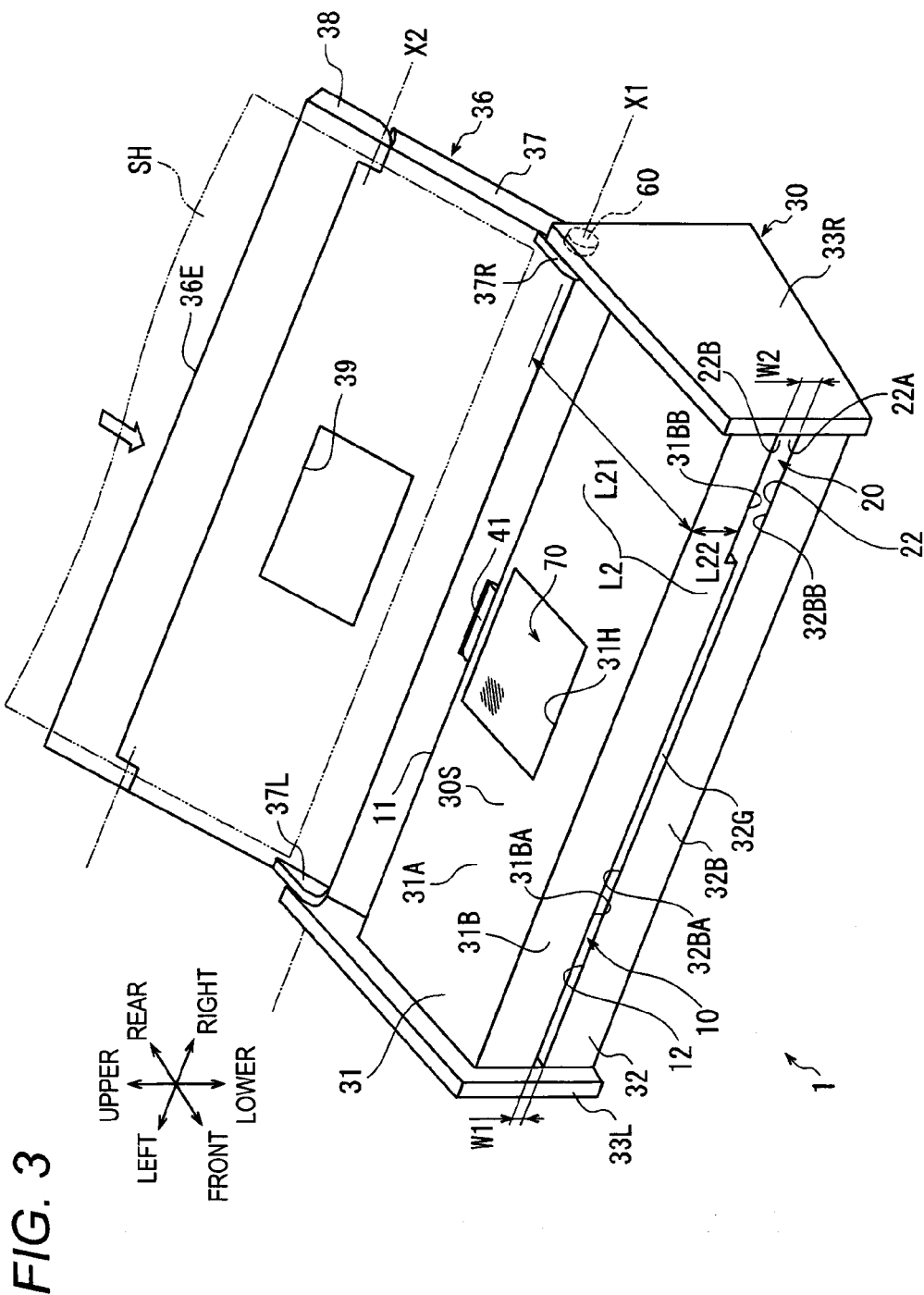
FIG. 3 is a front perspective view illustrating the image reading apparatus at a state where a feeding tray is located at an open position.
Figure 6:
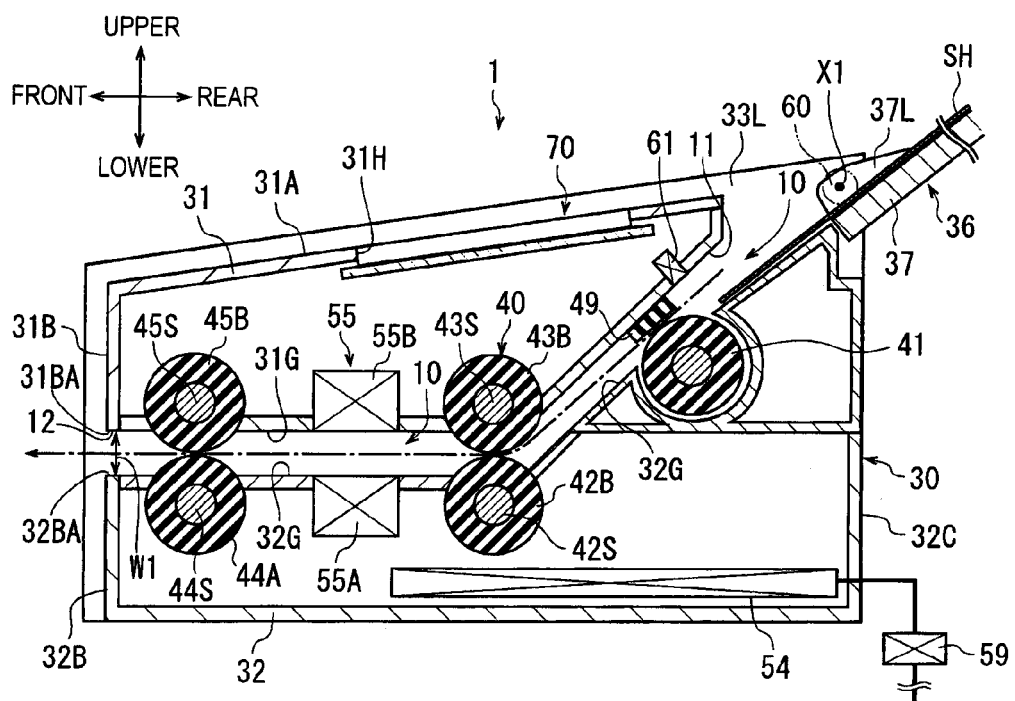
FIG. 6 is a schematic sectional view taken along a line A-A of FIG. 5.
Figure 7:
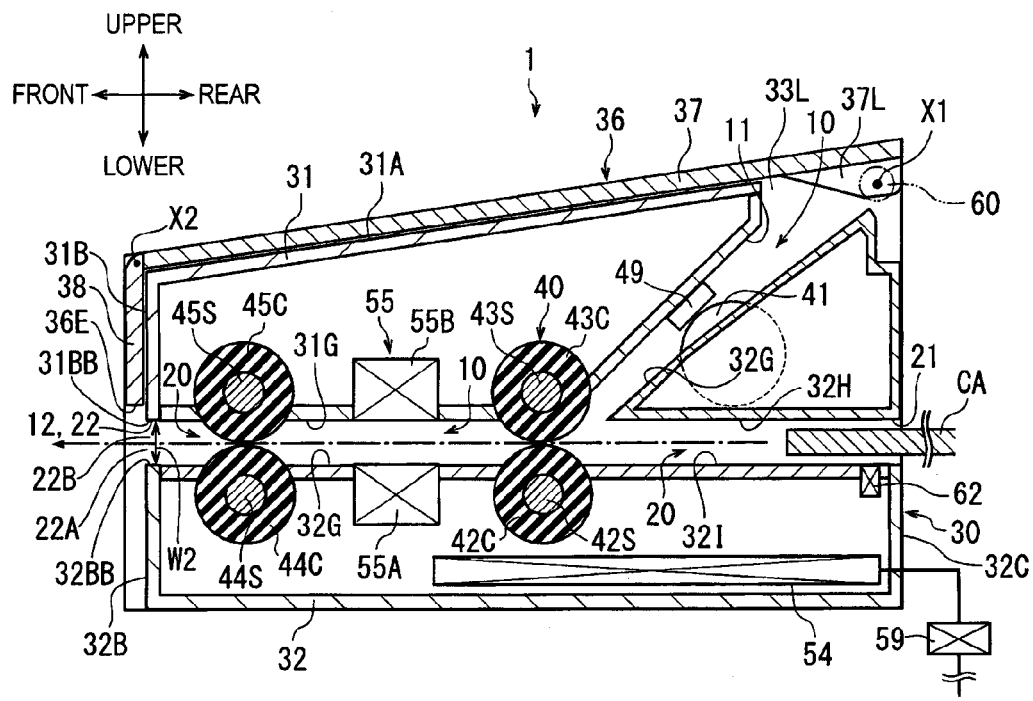
FIG. 7 is a schematic sectional view taken along a line B-B of FIG. 5, showing a state where the feeding tray is located at a close position.

As shown in FIGS. 3, 6 and 7, the housing 30 has a first housing 31, a second housing 32 and a pair of side frames 33L, 33R.

The first housing 31 positioned at an upper side and the second housing 32 positioned at a lower side faces to each other at an interval in the upper-lower direction. The left side frame 33L and the right side frame 33R sandwich the first housing 31 and the second housing 32 from outer sides in the left-right direction.

The first housing 31 has a box shape having an upper surface 31A, a front side surface 31B, an upper side guide surface 31G and the like. The upper surface 31A is a plane facing upwards. The upper surface 31A is upwards inclined towards the rear. The upper surface 31A is provided at its center with the touch panel 70. The upper surface 31A is an example of the 'one surface of the housing' of this disclosure. The front side surface 31B is a plane facing forwards. The front side surface 31B continues to a front end edge of the upper surface 31A and extends perpendicularly downwards. The upper side guide surface 31G is a curved plane facing downwards. The upper side guide surface 31G continues to a lower end edge 31BA of the front side surface 31B and extends horizontally rearwards. The upper side guide surface 31G is bend upwards at a center of the first housing 31 in the front-rear direction and is upwards inclined towards the rear.

The second housing 32 has a box shape having a front side surface 32B, a lower side guide surface 32G and a rear surface 32C. The front side surface 32B is a plane facing forwards. An upper end edge 32BA of the front side surface 32B is spaced downwards from the lower end edge 31BA of the front side surface 31B at an interval. The front side surface 32B extends perpendicularly downwards. The lower side guide surface 32G is a curved plane facing upwards. The lower side guide surface 32G continues to the upper end edge 32BA of the front side surface 32B and extends horizontally rearwards. The lower side guide surface 32G is bent upwards at a center of the second housing 32 in the front-rear direction and is upwards inclined towards the rear. The rear surface 32C is a plane facing rearwards. The rear surface 32C continues to a rear end edge of the lower side guide surface 32G and extends perpendicularly downwards.

Figure 5:
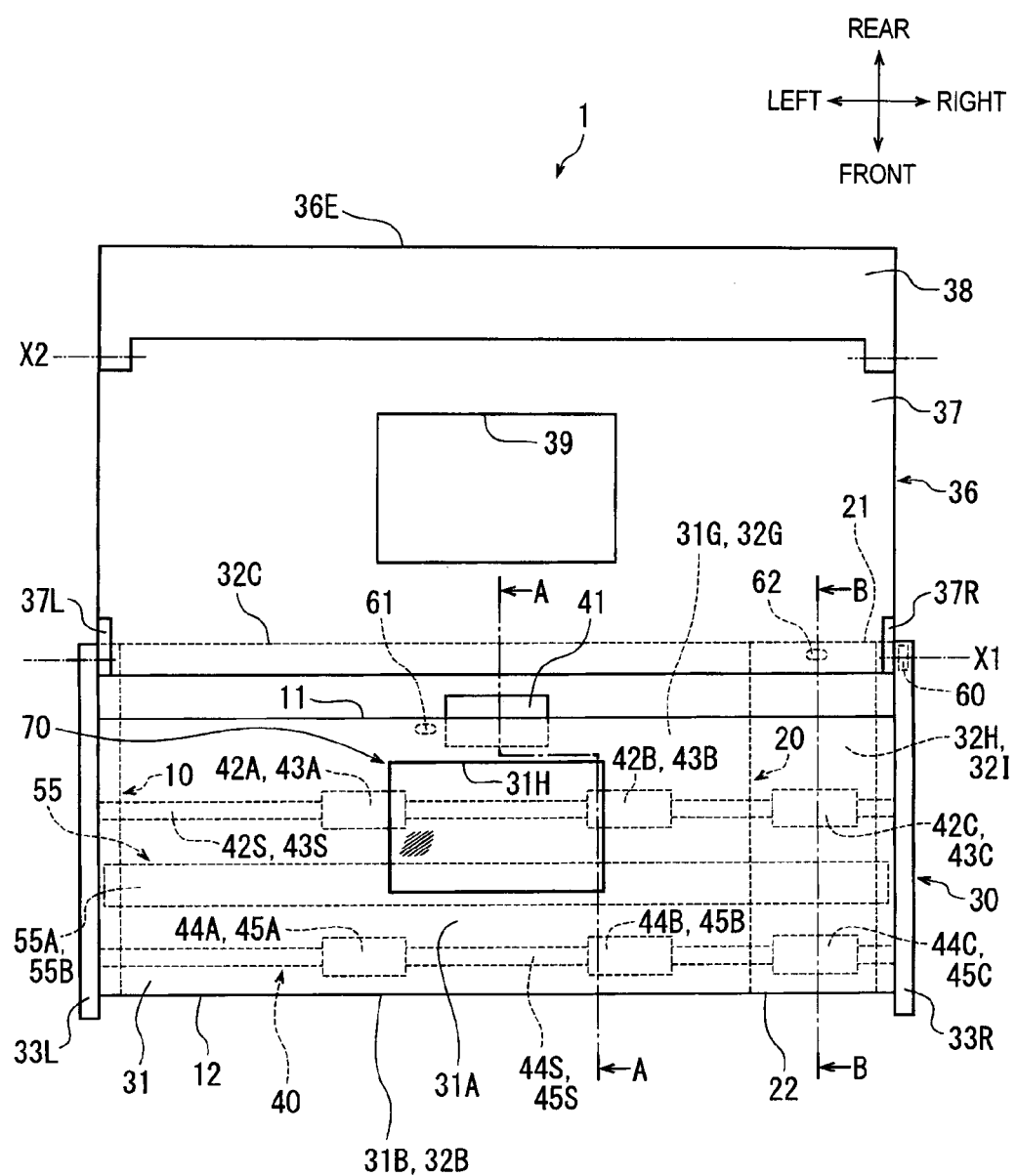
FIG. 5 is a plan view illustrating the image reading apparatus at a state where the feeding tray is located at the open position.

As shown in FIGS. 5 and 7, the second housing 32 has a lower side card guide surface 32I and an upper side card guide surface 32H. The lower side card guide surface 32I continues to a right end portion of a horizontal part of the lower side guide surface 32G, extends horizontally rearwards and reaches the rear surface 32C. The upper side card guide surface 32H is spaced upwards from the lower side card guide surface 32I. The upper side card guide surface 32H is parallel with the lower side card guide surface 32I, extends horizontally rearwards and reaches the rear surface 32C. As shown in FIG. 7, a height of the upper side card guide surface 32H in the upper-lower direction is substantially the same as a height of the horizontal part of the upper side guide surface 31G in the upper-lower direction.

As shown in FIGS. 1 to 3 and 5 to 7, the housing 30 is formed with a first introduction opening 11, a first discharge opening 12, a first conveyance path 10, a second introduction opening 21, a second discharge opening 22 and a second conveyance path 20.

As shown in FIGS. 3, 6 and 7, a sheet SH is introduced into the first introduction opening 11. The sheet SH is a sheet, an OHP sheet and the like. The sheet SH is an example of the 'first medium' of this disclosure. More specifically, the first introduction opening 11 is a slit between the rear end edge of the upper side guide surface 31G and the rear end edge of the lower side guide surface 32G. The first introduction opening 11 extends in the left-right direction from a vicinity of the left side frame 33L to a vicinity of the right side frame 33R. The first introduction opening 11 has a first length in the left-right direction. The first length is larger than a width of the sheet SH.

The sheet SH is discharged from the first discharge opening 12. More specifically, the first discharge opening 12 is a slit between the lower end edge 31BA of the front side surface 31B and the upper end edge 32BA of the front side surface 32B. The first discharge opening 12 extends in the left-right direction from a vicinity of the left side frame 33L to a vicinity of the right side frame 33R. A length of the first discharge opening 12 in the left-right direction is larger than the width of the sheet SH, like the first introduction opening 11.

As shown in FIGS. 6 and 7, the first conveyance path 10 guides the sheet SH from the first introduction opening 11 towards the first discharge opening 12. More specifically, the first conveyance path 10 is a passage that is formed between the upper side guide surface 31G and the lower side guide surface 32G with being sandwiched in the upper-lower direction. In this disclosure, the 'guide' does not necessarily mean that the sheet SH is conveyed with abutting on the upper side guide surface 31G or lower side guide surface 32G all the time. Therefore, for example, the description of the 'guide' also includes a configuration where the sheet SH is conveyed with occasionally abutting on the lower side guide surface 32G. The first conveyance path 10 is inclined downwards from the first introduction opening 11 towards the front. The first conveyance path 10 is bended forwards at the center of the housing 30 in the front-rear direction and extends horizontally up to the first discharge opening 12.

Figure 2:
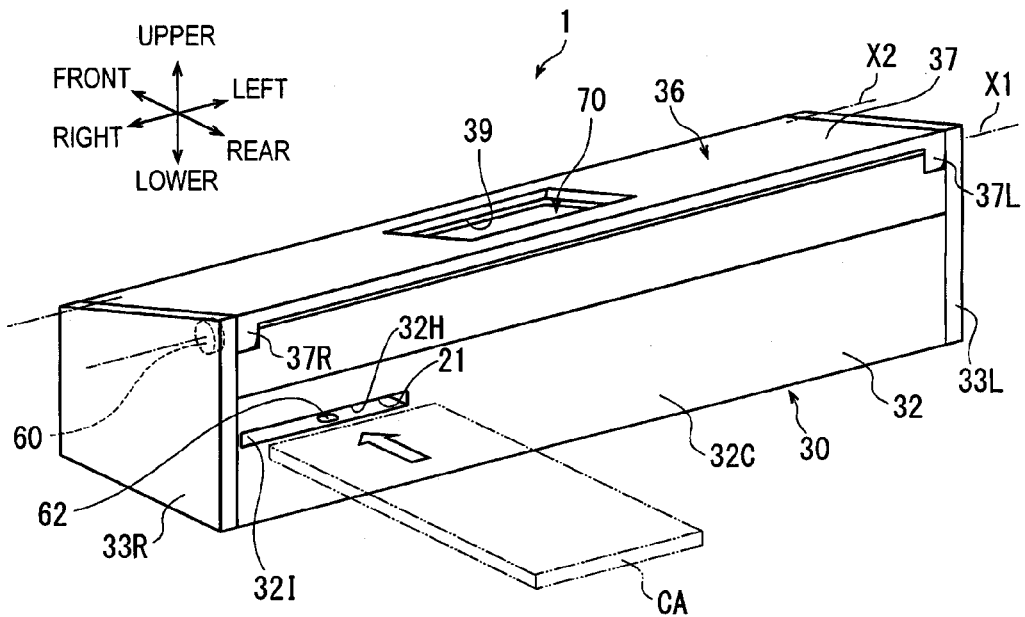
FIG. 2 is a rear perspective view illustrating the image reading apparatus.

As shown in FIGS. 2, 5 and 7, a card CA is introduced into the second introduction opening 21. The card CA is narrower than the sheet SH in the left-right direction as shown in FIGS. 2 and 3. The card CA is a sheet having an area smaller than the sheet SH. The card CA may be a name card, a cash card, a membership card, a license or the like, for example. When the card CA is a sheet that is made of paper such as name card, a thickness thereof may be substantially the same as the sheet SH. Also, when the card CA is a sheet made of resin such as cash card, a thickness thereof may be thicker and more rigid than the sheet SH. The card CA is an example of the 'second medium' of this disclosure. More specifically, the second introduction opening 21 is opened in the front-rear direction at a central portion of the rear surface 32C in the upper-lower direction and at a side of the right side frame 33R. The second introduction opening 21 extends in the left-right direction. The second introduction opening 21 has a second length in the left-right direction. The second length is longer than the width of the card CA but shorter than the first length of the first introduction opening 11. A height of the second introduction opening 21 in the upper-lower direction is substantially the same as heights of the horizontal part of the first conveyance path 10 and the first discharge opening 12 in the upper-lower direction.

As shown in FIGS. 1, 3, 5 and 7, the card CA is discharged from the second discharge opening 22. More specifically, the second discharge opening 22 is a slit between a right end portion 31BB of the lower end edge 31BA of the front side surface 31B and a right end portion 32BB of the upper end edge 32BA of the front side surface 32B. As shown in FIG. 3, the second discharge opening 22 is elongated leftwards from the vicinity of the right side frame 33R. A length of the second discharge opening 22 in the left-right direction is also longer than the width of the card CA, like the second introduction opening 21. The second discharge opening 22 is commonly used with a part of the right end side of the first discharge opening 12.

That is, the first discharge opening 12 includes a lower area 22A of the second discharge opening 22. Therefore, the sheet SH can pass through the lower area 22A of the second discharge opening 22 and then can be discharged from the lower area 22A of the second discharge opening 22. The card CA may be discharged from the lower area 22A of the second discharge opening 22 or from the lower area 22A of the second discharge opening 22 and the upper area 22B of the second discharge opening 22. Like this, in this disclosure, the descriptions of the 'first' discharge opening and the 'second' discharge opening also include a configuration where the first discharge opening includes the second discharge opening. Likewise, the descriptions of the 'first' conveyance path and the 'second' conveyance path also include a configuration where the first conveyance path includes the second conveyance path. Likewise, the descriptions of the 'first' introduction opening and the 'second' introduction opening also include a configuration where the first introduction opening includes the second introduction opening.

An opening width W2 of the second discharge opening 22 in the upper-lower direction is larger than an opening width W1 of the first discharge opening 12 in the upper-lower direction, in correspondence to a range of the thickness of the card CA. A width of the second discharge opening 22 in the left-right direction is smaller than the length of the first discharge opening 12 in correspondence to a range of the width of the card CA.

As shown in FIGS. 5 and 7, the card CA is guided from the second introduction opening 21 towards the second discharge opening 22 through the second conveyance path 20. More specifically, the second conveyance path 20 is a passage that is formed by the upper side card guide surface 32H, the lower side card guide surface 32I, the horizontal part of the upper side guide surface 31G and the horizontal part of the lower side guide surface 32G with sandwiched therebetween in the upper-lower direction. The second conveyance path 20 extends horizontally from the second introduction opening 21 of the rear to the second discharge opening 22 of the front. That is, a part of the first conveyance path 10 also serves as a part of the second conveyance path 20.

As shown in FIG. 1 and the like, the feeding tray 36 has a first tray 37 and a second tray 38.

The first tray 37 has a flat plate shape. As shown in FIGS. 3 and 5, a pair of hinge parts 37L, 37R is integrally formed with left and right corner portions of the first tray 37. A center of the first tray 37 is formed with an operation opening 39 that is opened in a rectangular shape. The first tray 37 is supported to both side frames 33L, 33R via both hinge parts 37L, 37R so that they can be rotated about a rotation axis X1. The rotation axis X1 is positioned at rear upper end portions of the side frames 33L, 33R and extends in the left-right direction.

The second tray 38 has a flat plate shape that is elongated in the left-right direction. The second tray 38 is connected to left and right corner portions of the first tray 37, which are at an opposite side to both hinge portions 37L, 37R. Thereby, the second tray 38 is supported to the first tray 37 about a rotation axis X2 extending in the left-right direction.

As shown in FIGS. 1, 2 and 7, at a close state, the first tray 37 covers the first introduction opening 11 so as to cover the upper surface 31A of the first housing 31 from the upper. The position of the feeding tray 36 shown in FIGS. 1, 2 and 7 is referred to as a 'close position.' When the feeding tray 36 is located at the close position, the first tray 37 is located so that it is inclined downwards towards the front from the rotation axis X1. When the feeding tray 36 is located at the close position, the second tray 38 extends perpendicularly downwards from the rotation axis X2 and covers the front side surface 31B of the first housing 31 from the front. As shown in FIG. 1, the operation opening 39 abuts the touch panel 70 when the feeding tray 36 is located at the close position. In other word, the operation opening 39 exposes the touch panel 70 to the outside at a state where the feeding tray 36 is located at the close position.

As shown in FIGS. 3, 5 and 6, the first tray 37 is rotated rearwards from the state shown in FIG. 1 and so on about the rotation axis X1 and is thus opened. The second tray 38 is rotated rearwards from the state shown in FIG. 1 and so on about the rotation axis X2 and is thus opened. According to this rotation, as shown in FIGS. 3, 5 and 6, the first tray 37 and the second tray 38 are displaced to a position at which they are upwards inclined towards the rear at the rear side of the housing 30. A position of the feeding tray 36 shown in FIGS. 3, 5 and 6 is referred to as an 'open position.'

As shown in FIGS. 1 and 7, at a state where the feeding tray 36 is located at the close position, a front end edge 36E of the feeding tray 36 extends towards the first discharge opening 12 and second discharge opening 22. The front end edge 36E of the feeding tray 36 is a front end edge of the second tray 38. The second discharge opening 22 is an example of the 'opening that is at least one of the second introduction opening and the second discharge opening' of this disclosure.

As shown in FIG. 1, a distance L1 from the rotation axis X1 to the front end edge 36E on a surface 36S of the feeding tray 36 located at the close position is a sum of a distance L11 from the rotation axis X1 to a front end edge of the first tray 37 and a distance L12 from the front end edge of the first tray 37 to the front end edge of the second tray 38. The surface 36S of the feeding tray 36 is surfaces of the first tray 37 and second tray 38. As shown in FIG. 3, a distance L2 from the rotation axis X1 to the second discharge opening 22 on a surface 30S of the housing 30 is a sum of a distance L21 from the rotation axis X1 to a front end edge of the upper surface 31A of the first housing 31 and a distance L22 from the front end edge of the upper surface 31A to the right end portion 32BB of the upper end edge 32BA of the front side surface 32B forming the second discharge opening 22. The surface 30S of the housing 30 is the upper surface 31A and front side surface 31B of the first housing 31.

At the close position, the distance L1 from the rotation axis X1 to the front end edge 36E on the surface 36S of the feeding tray 36 is smaller than the distance L2 from the rotation axis X1 to the second discharge opening 22 on the surface 30S of the housing 30. In other words, a front end edge 36E of the feeding tray 36 is positioned at an upper side of the second discharge opening 22 at a state where the feeding tray 36 is located at the close position. Accordingly, as shown in FIGS. 1, 2 and 7, the feeding tray 36 covers the first introduction opening 11 and exposes the second introduction opening 21 and the second discharge opening 22 at the close position.

Also, as shown in FIGS. 3 and 6, at the open position, the feeding tray 36 is inclined so that it continues to the inclined part of the lower side guide surface 32G and is opened to the first introduction opening 11. One or more sheets SH are put on the feeding tray 36. Although not shown, the feeding tray 36 has a pair of left and right guide parts. The guide parts sandwich the sheet SH put on the feeding tray 36 from the outer sides in the left-right direction and position the sheet in the left-right direction. Since the feeding tray 36 is provided around the first introduction opening 11, the sheet SH put on the feeding tray 36 is received by the first introduction opening 11 and is guided towards the first discharge opening 12 on the first conveyance path 10.

Figure 4:
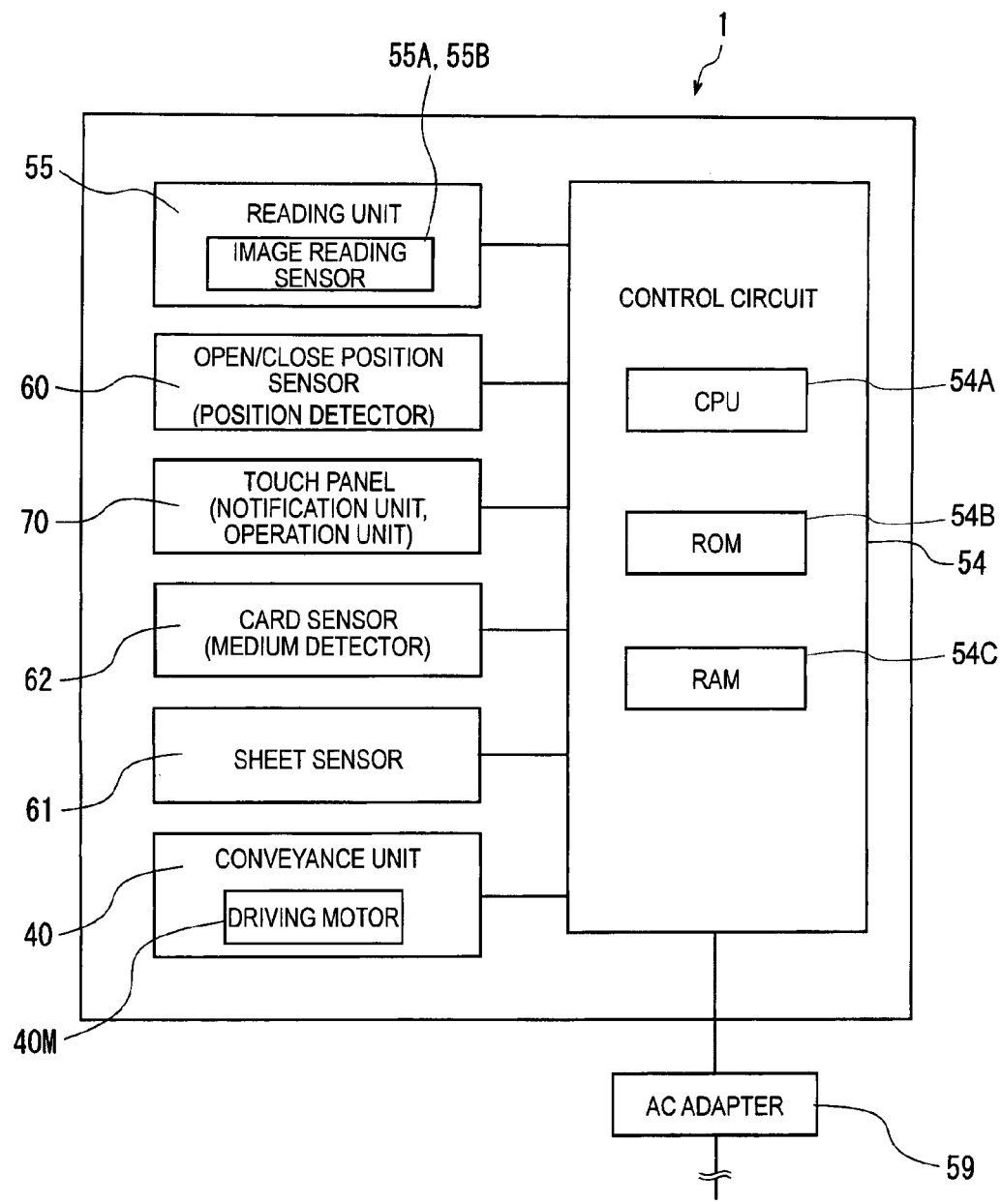
FIG. 4 is a block diagram of the image reading apparatus.

As shown in FIGS. 4, 6 and 7, power is fed from a household wall outlet (not shown) to the conveyance unit 40, the reading unit 55, the touch panel 70, the open/close position sensor 60, a sheet sensor 61, a card sensor 62 and so on via an AC adapter 59 and the control circuit 54.

The control circuit 54, which is an example of a controller, has a CPU 54A, a ROM 54B, a RAM 54C and the like. The control circuit 54 may include other circuits, such as a control circuit of the reading unit 55, a power management circuit and the like. That is, the control circuit 54 may be an ASIC (Application Specific Integrated Circuit) including a CPU 54A. The power management circuit may control power consumption states of the image reading apparatus 1. As shown in FIG. 4, the control circuit 54 is electrically connected to the conveyance unit 40, the reading unit 55, the touch panel 70, the open/close position sensor 60, the sheet sensor 61, the card sensor 62 and so on and controls the same.

As shown in FIGS. 5 to 7, the conveyance unit 40, which is an example of a conveyer, has a supply roller 41, a separation pad 49, conveyance rollers 42A, 42B, 42C, driven rollers 43A, 43B, 43C, discharge rollers 44A, 44B, 44C and driven rollers 45A, 45B, 45C. The reading unit 55, which is an example of an image reader, has image reading sensors 55A, 55B. They are arranged on the first conveyance path in order of the supply roller 41, the separation pad 49, the conveyance rollers 42A, 42B, 42C, the driven rollers 43A, 43B, 43C, the image reading sensors 55A, 55B, the discharge rollers 44A, 44B, 44C and the driven rollers 45A, 45B, 45C from the first introduction opening 11 towards the first discharge opening 12. In the below, the configurations thereof are described in corresponding order.

The supply roller 41 is rotatably supported in the second housing 32. An upper part of the supply roller 41 is exposed to the first conveyance path 10 through the inclined part of the lower side guide surface 32G. The supply roller 41 is driven by a driving motor 40M shown in FIG. 4 as the control circuit 54 controls the driving motor 40M. The supply roller 41 rotates with abutting on the sheet SH put on the feeding tray 36, thereby conveying the sheet SH from the first introduction opening 11 towards the first discharge opening 12 on the first conveyance path 10.

The separation pad 49 is mounted on the first housing 31. The separation pad 49 is exposed to the first conveyance path 10 on the upper side guide surface 31G. The separation pad 49 is a plate-shaped member configured by a friction member made of rubber, elastomer and the like. The separation pad 49 is urged by an urging member (not shown) and is thus pressed to the supply roller 41. Thereby, the separation pad 49 can hold and separate the sheet SH, which is conveyed on the first conveyance path 10, one by one between the separation pad and the supply roller 41.

As shown in FIGS. 5 to 7, the conveyance rollers 42A, 42B, 42C are rotatably supported in the second housing 32 by one rotary shaft 42S. Upper parts of the conveyance rollers 42A, 42B, 42C are exposed to the first conveyance path 10 through a connection part of the inclined part and horizontal part of the lower side guide surface 32G. As the control circuit 54 controls the driving motor 40M, the conveyance rollers 42A, 42B, 42C are driven by the driving motor 40M and are rotated synchronously with the supply roller 41. The driven rollers 43A, 43B, 43C42C are rotatably supported in the second housing 32 by one rotary shaft 43S. Lower parts of the driven rollers 43A, 43B, 43C are exposed to the first conveyance path 10 through a connection part of the inclined part and horizontal part of the upper side guide surface 31G. The driven rollers 43A, 43B, 43C are urged by an urging member (not shown) and are thus pressed to the conveyance rollers 42A, 42B, 42C. Thereby, the conveyance rollers 42A, 42B, 42C are rotated with holding the sheet SH, which is conveyed on the first conveyance path 10, between the conveyance rollers 42A, 42B, 42C and the driven rollers 43A, 43B, 43C, thereby conveying the sheet SH towards the first discharge opening 12.

A part of the first conveyance path 10 also serves as a part of the second conveyance path 20. Hence, as shown in FIGS. 5 and 7, the right conveyance roller 42C and the right driven roller 43C are also exposed to the second conveyance path 20. Thereby, the conveyance roller 42C is rotated with holding the card CA, which is received by the second introduction opening 21, between the conveyance roller 42C and the driven roller 43C on the second conveyance path 20, thereby conveying the card CA towards the second discharge opening 22.

As shown in FIGS. 5 to 7, the image reading sensor 55A is mounted on the second housing 32. An upper surface of the image reading sensor 55A is exposed to the first conveyance path 10 at the horizontal part of the lower side guide surface 32G. The image reading sensor 55B is mounted on the first housing 31. A lower surface of the image reading sensor 55B is exposed to the first conveyance path 10 at the horizontal part of the upper side guide surface 31G. That is, the image reading sensors 55A, 55B face with each other so that they sandwich the first conveyance path 10 in the upper-lower direction. Also, a part of the first conveyance path 10 serves as a part of the second conveyance path 20. Thereby, as shown in FIGS. 5 and 7, the image reading sensors 55A, 55B face with each other so that they sandwich the second conveyance path 20 from the upper-lower direction. Meanwhile, in this disclosure, the 'face' does not necessarily mean the 'truly face'. For example, a part of the image reading sensor 55A may deviate relative to the image reading sensor 55B in the conveyance direction of the sheet SH. As the image reading sensors 55A, 55B, a CIS (Contact Image Sensor), a CCD (Charge Coupled Device) and the like are adopted, for example.

The discharge rollers 44A, 44B, 44C are rotatably supported in the second housing 32 by one rotary shaft 44S. Upper parts of the discharge rollers 44A, 44B, 44C are exposed to the first conveyance path 10 from the horizontal part of the lower side guide surface 32G. When the control circuit 54 controls the driving motor 40M, the discharge rollers 44A, 44B, 44C are driven by the driving motor 40M, so that the discharge rollers 44A, 44B, 44C are rotated synchronously with the supply roller 41 and the conveyance rollers 42A, 42B, 42C. The driven rollers 45A, 45B, 45C are rotatably supported in the first housing 31 by one rotary shaft 45S. Lower parts of the driven rollers 45A, 45B, 45C are exposed to the first conveyance path 10 from the horizontal part of the upper side guide surface 31G. The driven rollers 45A, 45B, 45C are urged by an urging member (not shown) and are thus pressed to the discharge rollers 44A, 44B, 44C. Thereby, the discharge rollers 44A, 44B, 44C are rotated with holding the sheet SH, which is conveyed on the first conveyance path 10, between the discharge rollers 44A, 44B, 44C and the driven rollers 45A, 45B, 45C, thereby discharging the sheet SH to the outside of the housing 30 through the first discharge opening 12.

A part of the first conveyance path 10 serves as a part of the second conveyance path 20. Thereby, as shown in FIGS. 5 and 7, the right discharge roller 44C and the right driven roller 45C are exposed to the second conveyance path 20, too. Therefore, the discharge roller 44C is rotated with holding the card CA, which is conveyed to the conveyance roller 42C and to the driven roller 43C, between the discharge roller 44C and the driven roller 45C, and then discharge the card CA to the outside of the housing 30 through the second discharge opening 22.

As shown in FIGS. 3 and 6, for example, the touch panel 70 is mounted to a side of the upper surface 31A in the first housing 31. The touch panel 70 is exposed to the outside through a rectangular opening 31H for a touch panel formed on the upper surface 31A. The touch panel 70 has a liquid crystal panel, a light source such as fluorescent lamp and LED, which illuminates light from a backside of the liquid crystal panel, and a contact detection film that is adhered on a surface of the liquid crystal panel. The touch panel 70 is an example of the 'operation device' of this disclosure.

The touch panel 70 issues a notification to the outside. Specifically, the touch panel 70 is controlled by the control circuit 54 and displays an operating status and so on of the image reading apparatus 1 such as a processing status of an image reading operation and an error status. The touch panel 70 also receives an operation from the outside. Specifically, the touch panel 70 displays a variety of buttons such as a 'START' button B1 shown in FIG. 1. When a user contacts the touch panel 70 so as to input an execution instruction of processing or a setting corresponding to any one button, the touch panel 70 receives the corresponding operation and transmits the received operation to the control circuit 54.

As shown in FIGS. 1 and 3, for example, the open/close position sensor 60 is to detect a position of the feeding tray 36 relative to the housing 30. More specifically, the open/close position sensor 60 is provided at a rear upper end portion of the right side frame 33R and is thus adjacent to the right hinge part 37R. The open/close position sensor 60 is configured by a micro switch, a rotary switch and so on and is disconnected/ connected as the feeding tray 36 is rotated about the rotation axis X1. The open/close position sensor 60 detects that the feeding tray 36 is located at the close position and transmits a detection signal of the close position to the control circuit 54. Also, the open/close position sensor 60 detects that the feeding tray 36 is located at the open position and transmits a detection signal of the open position to the control circuit 54. The open/close position sensor 60 is an example of the 'position detector' of this disclosure.

As shown in FIGS. 2, 5 and 7, the sheet sensor 61 can detect whether there is the sheet SH in the first introduction opening 11. More specifically, the sheet sensor 61 is provided in the first housing 31. The sheet sensor 61 is located in the vicinity of the separation pad 49 on the upper side guide surface 31G. The sheet sensor 61 is configured by an optical proximity sensor, an ultrasonic proximity sensor or the like detecting that an object comes close or gets away. The sheet sensor 61 transmits detection signals of two types to the control circuit 54 in correspondence to whether the sheet SH exists in the first introduction opening 11.

The card sensor 62 can detect whether there is the card CA in the second introduction opening 21. More specifically, the card sensor 62 is provided in the second housing 32. The card sensor 62 is exposed to the second conveyance path 20 at a side of a rear end edge of the lower side card guide surface 32I. The card sensor 62 is configured by an optical proximity sensor, an ultrasonic proximity sensor or the like detecting that an object comes close or gets away. The card sensor 62 transmits detection signals of two types to the control circuit 54 in correspondence to whether the card CA exists in the second introduction opening 21. The card sensor 62 is an example of the 'medium detector' of this disclosure.

The first introduction opening 11 and the second introduction opening 21 are located at the same side with respect to the reading unit 55 in a direction facing from the rear to the front, which is a conveyance direction along which the card CA is conveyed from the second introduction opening 21 towards the second discharge opening 22, i.e., at the rear side relative to the reading unit 55.

The first discharge opening 12 and the second discharge opening 22 are located at an opposite side to the first introduction opening 11 and the second introduction opening 21 with respect to the reading unit 55 in the direction facing from the rear to the front, which is the conveyance direction of the card CA, i.e., at the front side relative to the reading unit 55.

The second discharge opening 22 is located at an opposite side to the rotation axis X1 with respect to the reading unit 55 in the direction facing from the rear to the front, which is the conveyance direction of the card CA, i.e., at the front side relative to the reading unit 55.

When a standby state continues for a long time while a power supply of the image reading apparatus 1 is ON, for example, the control circuit 54 can switch the image reading apparatus 1 into a low power consumption state. The low power consumption state is a state that is generally referred to as a sleep state. When the low power consumption state is released, the image reading apparatus 1 shifts to the standby state. When the standby state is released, the image reading apparatus 1 shifts to a reading mode of conveying the sheet SH or card CA and reading an image of the sheet SH or card CA. The low power consumption state is a state where the power consumption is lower than the standby state and the reading state. In the meantime, the standby state is a state where the power consumption is lower than the reading mode.

<Image Reading Operation of Card and Sheet>

The image reading apparatus 1 reads images of the card CA and the sheet SH, as follows. When the image reading apparatus 1 reads an image of the card CA, the feeding tray 36 is kept at the close position if the feeding tray is located at the close position or the feeding tray 36 is moved to the close position if the feeding tray is located at the open position. As shown in FIG. 2, the second introduction opening 22 receives the card CA from the rear of the housing 30. The card CA is introduced to the second conveyance path 20. In the meantime, when the image reading apparatus 1 reads an image of the sheet SH, the feeding tray 35 is moved from the close position to the open position. The sheet SH is put onto the feeding tray 36, as shown in FIGS. 3 and 6.

Figure 8:
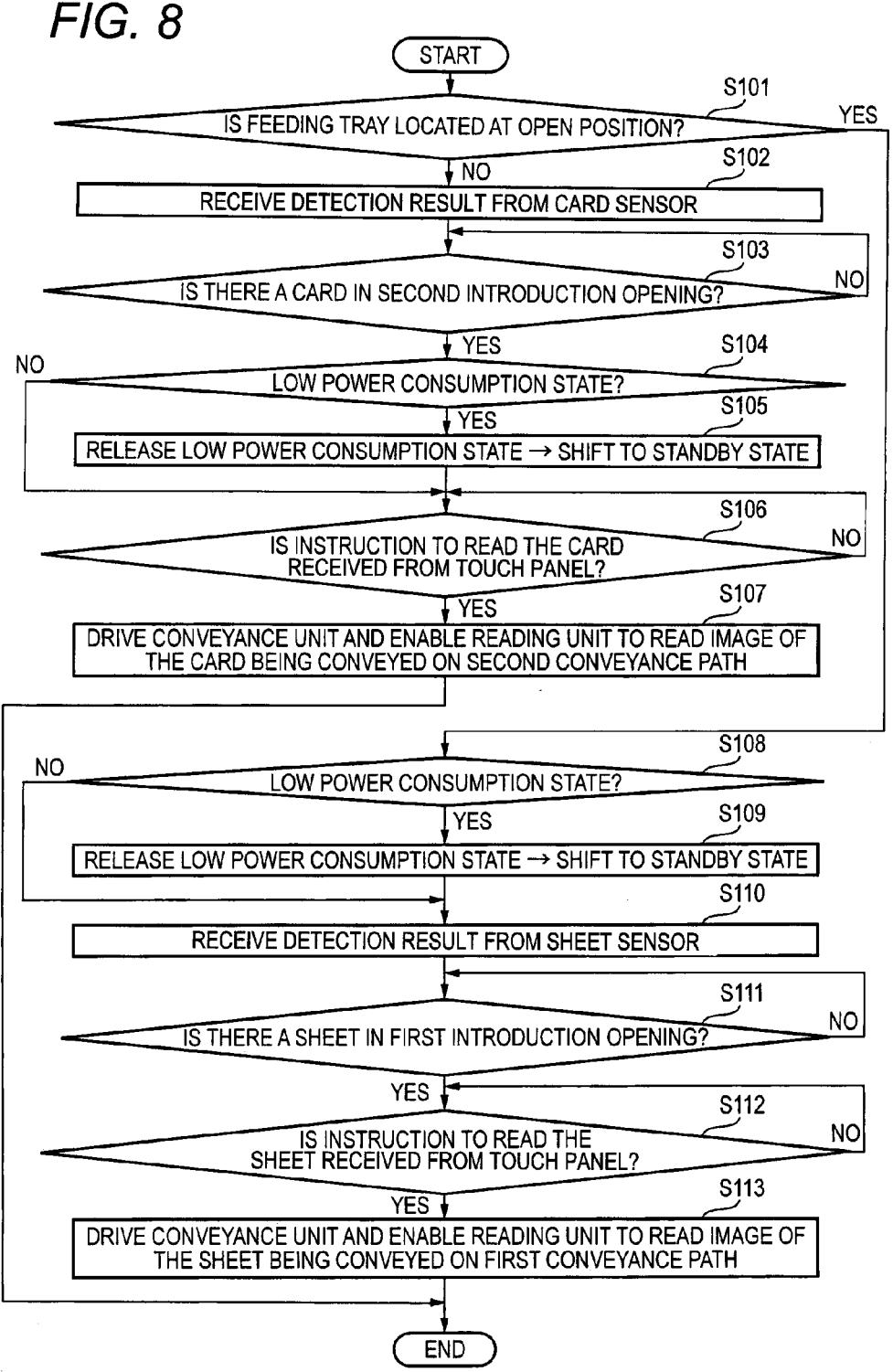
FIG. 8 is a flowchart of image reading processing of a card CA and a sheet SH, which is performed by the image reading apparatus.

Mainly, the CPU 54A of the control circuit 54 repeatedly executes a flowchart shown in FIG. 8 when the power supply is ON. In the below, processing that the CPU 54A executes in respective steps is sequentially described.

First, in step S101, the CPU 54A receives a detection result from the open/close position sensor 60. When the open/close position sensor 60 detects that the feeding tray 36 is located at the open position, i.e., when a result of determination in step S101 is 'Yes', the CPU 54A proceeds to step S108.

On the other hand, when the open/close position sensor 60 detects that the feeding tray 36 is not located at the open position, i.e., that the feeding tray 36 is located at the close position, i.e., when a result of determination in step S101 is 'No', the CPU 54A proceeds to step S102. When the CPU 54A proceeds to step S102, the CPU 54A receives a detection result from the card sensor 62.

Then, in step S103, the CPU 54A determines whether the card sensor 62 detects that there is a card CA in the second introduction opening 21 based on the detection result received from the card sensor 62. When the card sensor 62 detects that there is a card CA in the second introduction opening 21, i.e., when a result of determination in step S103 is 'Yes', the CPU 54A proceeds to step S104. On the other hand, when the card sensor 62 detects that there is no card CA in the second introduction opening 21, i.e., when a result of determination in step S103 is 'No', the CPU 54A returns to step S103.

Subsequently, in step S104, when the image reading apparatus 1 is at the low power consumption state, i.e., when a result of determination in step S104 is 'Yes', the CPU 54A proceeds to step S105. Then, in step S105, the CPU 54A releases the low power consumption state of the image reading apparatus 1, shifts to the standby state and proceeds to step S106.

On the other hand, in step S104, when the image reading apparatus 1 is not at the low power consumption state, i.e., when a result of determination in step S104 is 'No', the CPU 54A proceeds to step S106.

When the CPU 54A shifts to step S106 from step S104 or S105, the CPU 54A determines whether an instruction to read the card CA is received from the touch panel 70. The card reading instruction of the touch panel 70 is generated when the card reading 'START' button B1 displayed on the touch panel 70 is pressed, and is then transmitted to the control circuit 54. When it is determined in step S106 that there is the card reading instruction, i.e., when a result of determination in step S106 is 'Yes', the CPU 54A proceeds to step S107. On the other hand, when it is determined in step S106 that there is no card reading instruction, i.e., when a result of determination in step S106 is 'No', the CPU 54A returns to step S106.

When the CPU 54A proceeds to step S107, the CPU 54A drives the driving motor 40M of the conveyance unit 40. Accordingly, the conveyance roller 42C and driven roller 43C and the discharge roller 44C and driven roller 45C of the conveyance unit 40 convey the card CA, which is introduced from the second introduction opening 21, on the second conveyance path 20. Images of both sides of the card CA, which is conveyed on the second conveyance path 20, are read by the image reading sensors 55A, 55B. As shown in FIG. 1, the card CA, for which the image reading has been completed, is discharged to the outside of the housing 30 through the second discharge opening 22 by the discharge roller 44C and the driven roller 45C. Accordingly, the flowchart shown in FIG. 8 is over and returns to the start.

When the CPU 54A shifts to step S108 from step S101 and the image reading apparatus 1 is at the low power consumption state, i.e., when a result of determination in step S108 is 'Yes', the CPU 54A proceeds to step S109. Then, in step S109, the CPU 54A releases the low power consumption state of the image reading apparatus 1, shifts to the standby state and proceeds to step S110.

On the other hand, in step S108, when the image reading apparatus 1 is not at the low power consumption state, i.e., when a result of determination in step S108 is 'No', the CPU 54A proceeds to step S110.

When the CPU 54A shifts to step S110 from step S108 or step S109, the CPU 54A receives a detection result from the sheet sensor 61.

Subsequently, in step S111, the CPU 54A determines whether the sheet sensor 61 detects that there is the sheet SH in the first introduction opening 11 based on the detection result received from the sheet sensor 61.

In step S111, when the sheet sensor 61 detects that there is the sheet SH in the first introduction opening 11, i.e., when a result of determination in step S111 is 'Yes', the CPU 54A proceeds to step S112. On the other hand, when the sheet sensor 61 detects that there is no sheet SH in the first introduction opening 11, i.e., when a result of determination in step S111 is 'No', the CPU 54A returns to step S111.

When the CPU 54A proceeds to step S112, the CPU 54A determines whether an instruction to read the sheet SH is received from the touch panel 70. The sheet reading instruction of the touch panel 70 is generated as a sheet reading 'START' button displayed on the touch panel 70 is pressed, and is then transmitted to the control circuit 54. Although not shown, the sheet reading 'START' button is the same display as the card reading 'START' button shown in FIG. 1. When it is determined in step S112 that there is the sheet reading instruction, i.e., when a result of determination in step S112 is 'Yes', the CPU 54A proceeds to step S113. On the other hand, when it is determined that there is no sheet reading instruction, i.e., when a result of determination in step S112 is 'No', the CPU 54A returns to step S112.

When the CPU 54A proceeds to step S113, the CPU 54A drives the driving motor 40M of the conveyance unit 40. Accordingly, the supply roller 41 is rotated with holding the sheet SH between the supply roller 41 and the separation pad 49. The supply roller 41 introduces the sheet SH on the feeding tray 36 through the first introduction opening 11 and conveys the sheet SH towards the first discharge opening 12 on the first conveyance path 10. At this time, when a plurality of sheets SH is conveyed with overlapping with each other, the sheets SH can be separated one by one by the frictional force between the separation pad 49 and the sheet SH, for example.

Subsequently, the conveyance rollers 42A, 42B, 42C and driven rollers 43A, 43B, 43C and the discharge rollers 44A, 44B, 44C and driven rollers 45A, 45B, 45C of the conveyance unit 40 convey the sheet SH, which is introduced from the first introduction opening 11, on the first conveyance path 10. Images of both sides of the sheet SH, which is conveyed on the first conveyance path 10, are read by the image reading sensors 55A, 55B. The sheet SH, for which the image reading has been completed, is discharged to the outside of the housing 30 through the first discharge opening 12 by the discharge rollers 44A, 44B, 44C and the driven rollers 45A, 45B, 45C. Accordingly, the flowchart shown in FIG. 8 is over and returns to the start.

<Operational Effects>

According to the image reading apparatus 1 of the first illustrative configuration, the feeding tray 36 does not close the second introduction opening 21 and the second discharge opening 22 at the close position, as shown in FIGS. 1, 2 and 7. At a state where the feeding tray 36 is located at the close position, the card CA is conveyed by the conveyance unit 40. Thereby, the conveyance roller 42C and driven roller 43C and the discharge roller 44C and driven roller 45C of the conveyance unit 40 convey the card CA, which has been introduced into the second introduction opening 21 that is not closed by the feeding tray 36 located at the close position, on the second conveyance path 20. The image reading sensors 55A, 55B of the reading unit 55 read images of both sides of the card CA, which is conveyed on the second conveyance path 20. The card CA, for which the image reading has been completed, is discharged through the second discharge opening 22 that is not closed by the feeding tray 36 located at the close position. Accordingly, when reading the images of the card CA in the image reading apparatus 1, it is not necessary to perform the troublesome operation of displacing the feeding tray 36 from the close position to the open position.

Therefore, according to the image reading apparatus 1 of the first illustrative configuration, it is possible to improve the convenience. Also, according to the image reading apparatus 1, the feeding tray 36 located at the close position does not prevent a user from introducing the card CA into the second introduction opening 21 or taking out the card CA through the second discharge opening 22. Also, according to the image reading apparatus 1, when reading the images of the card CA, it is possible to make an occupying space as small as the feeding tray 36 is closed.

Also, according to the image reading apparatus 1, the control circuit 54 controls the driving of the conveyance unit 40, based on the detection result of the open/close position sensor 60. Thereby, the image reading apparatus 1 can read the images of the card CA at the state where the feeding tray 36 is located at the close position.

Also, according to the image reading apparatus 1, the control circuit 54 releases the low power consumption state when it is determined that there is the card CA in the second introduction opening 21, based on the detection result of the card sensor 62, in steps S102 to S105 of FIG. 8. Thereby, according to the image reading apparatus 1, it is not necessary for the user to perform the operation of releasing the low power consumption state even when the feeding tray 36 is located at the close position. Thus, it is possible to further improve the convenience.

Also, according to the image reading apparatus 1, the control circuit 54 drives the conveyance unit 40 when the instruction to read the card CA is input through the touch panel 70. Thereby, according to the image reading apparatus 1, the user can read the images of the card CA just by contacting the card reading 'START' button B1 displayed on the touch panel 70. Hence, it is possible to further improve the convenience.

Also, according to the image reading apparatus 1, at the state where the feeding tray 36 is located at the close position, the touch panel 70 provided on the upper surface 31A of the housing 30 is exposed to the outside through the operation opening 39. Thereby, according to the image reading apparatus 1, even when the feeding tray 36 is located at the close position, it is possible to easily operate the touch panel 70.

Also, according to the image reading apparatus 1, the distance L1 from the rotation axis X1 to the front end edge 36E on the surface 36S of the feeding tray 36 located at the close position is smaller than the distance L2 from the rotation axis X1 to the second discharge opening 22 on the surface 30S of the housing 30. Thereby, according to the image reading apparatus 1, it is possible to securely implement the configuration where the front end edge 36E of the feeding tray 36 located at the close position does not close the second discharge opening 22.

Also, according to the image reading apparatus 1, the first introduction opening 11 and the second introduction opening 21 are located at the same side with respect to the reading unit 55 in the conveyance direction of the card CA, i.e., at the rear side relative to the reading unit 55. The first discharge opening 12 and the second discharge opening 22 are located at the opposite side to the first introduction opening 11 and the second introduction opening 21 with respect to the reading unit 55 in the conveyance direction of the card CA, i.e., at the front side relative to the reading unit 55. According to the specific configuration, the image reading apparatus 1 can securely exhibit the operational effects of this disclosure.

Also, according to the image reading apparatus 1, a part of the first conveyance path 10 serves as a part of the second conveyance path 20. Thereby, according to the image reading apparatus 1, it is possible to reduce the manufacturing cost and to implement the miniaturization, compared to a configuration where the first conveyance path and the second conveyance path are separately provided.

Also, according to the image reading apparatus 1, when the flowchart shown in FIG. 8 is executed, if the card sensor 62 detects that there is the card CA in the second introduction opening 21 at the state where the feeding tray 36 is located at the close position, the conveyance unit 40 conveys the card CA towards the second discharge opening 22. Thereby, according to the image reading apparatus 1, when reading the images of the card CA, it is not necessary to perform the operation of displacing the feeding tray 36 from the close position to the open position.

Also, according to the image reading apparatus 1, when the flowchart shown in FIG. 8 is executed, if the touch panel 70 receives an operation at the state where the feeding tray 36 is located at the close position, the conveyance unit 40 conveys the card CA introduced into the second introduction opening 21 towards the second discharge opening 22. Thereby, according to the image reading apparatus 1, when reading the images of the card CA, it is not necessary to perform the operation of displacing the feeding tray 36 from the close position to the open position.

(Second Illustrative Configuration)

Figure 9:
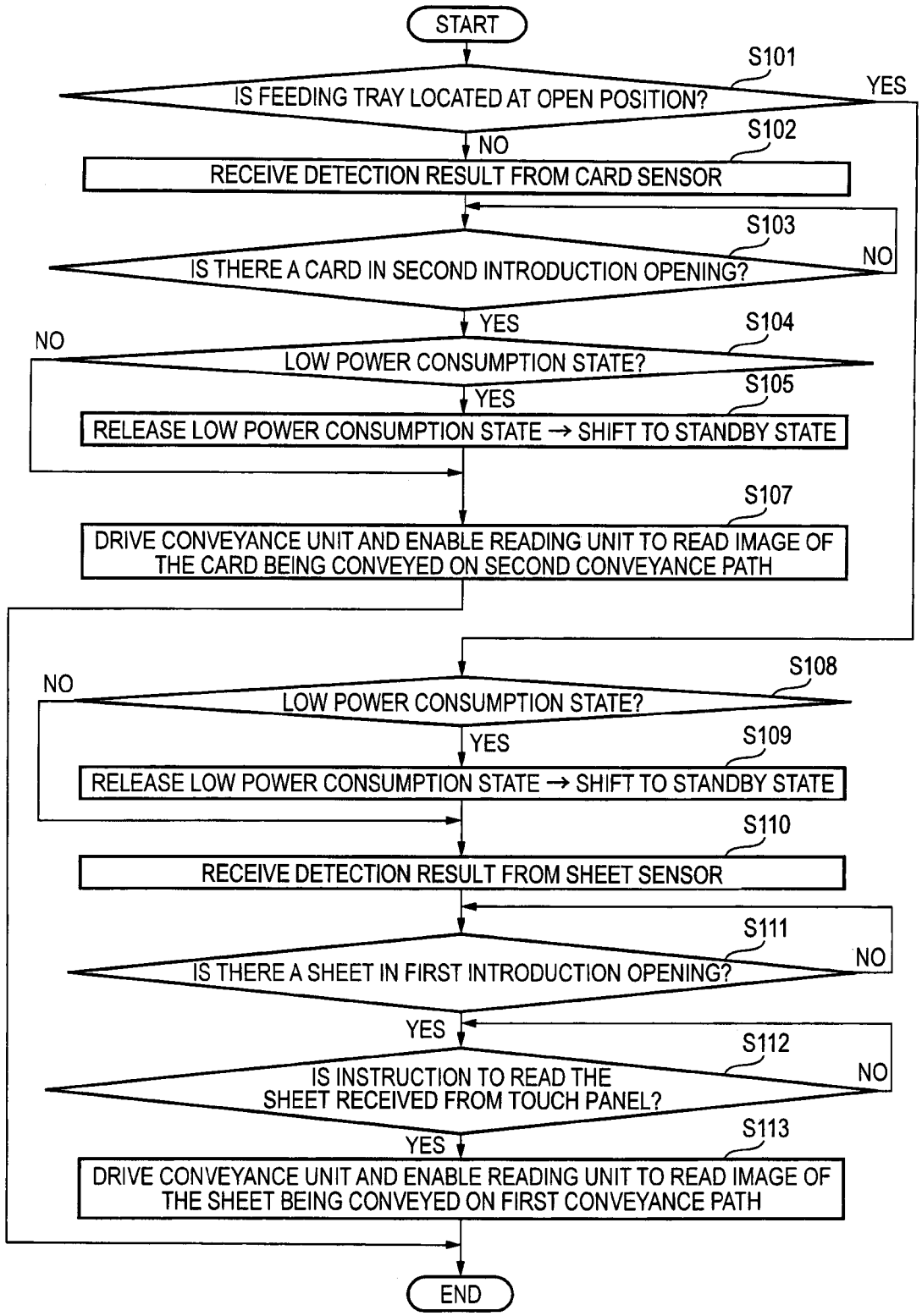
FIG. 9 is a flowchart of image reading processing of a card CA and a sheet, which is performed by an image reading apparatus of a second illustrative configuration.

An image reading apparatus of a second illustrative configuration executes a flowchart shown in FIG. 9, rather than the flowchart shown in FIG. 8. The other elements of the second illustrative configuration are the same as those of the first illustrative configuration.

In the flowchart shown in FIG. 9, the step S106 of the flowchart shown in FIG. 8 is omitted. That is, when it is determined in step S101 that the feeding tray 36 is not located at the open position, i.e., the feeding tray 36 is located at the close position and it is determined in step S103 that there is the card CA in the second introduction opening 21, the images of the card CA are read in step S107 even though the instruction to read the card CA is not input from the touch panel 70. The processing of the other steps is as described above.

The image reading apparatus of the second illustrative configuration can also realize the same operational effects as those of the image reading apparatus 1 of the first illustrative configuration.

Also, according to the image reading apparatus of the second illustrative configuration, irrespective of whether the instruction to read the card CA is input from the touch panel 70, when the card CA is introduced into the second introduction opening 21, the conveyance unit 40 is driven and the images of the card CA are read. Therefore, according to this image reading apparatus, since it is not necessary for the user to perform an operation of starting the conveyance of the card CA, it is possible to further improve the convenience.

(Third Illustrative Configuration)

Figure 10:
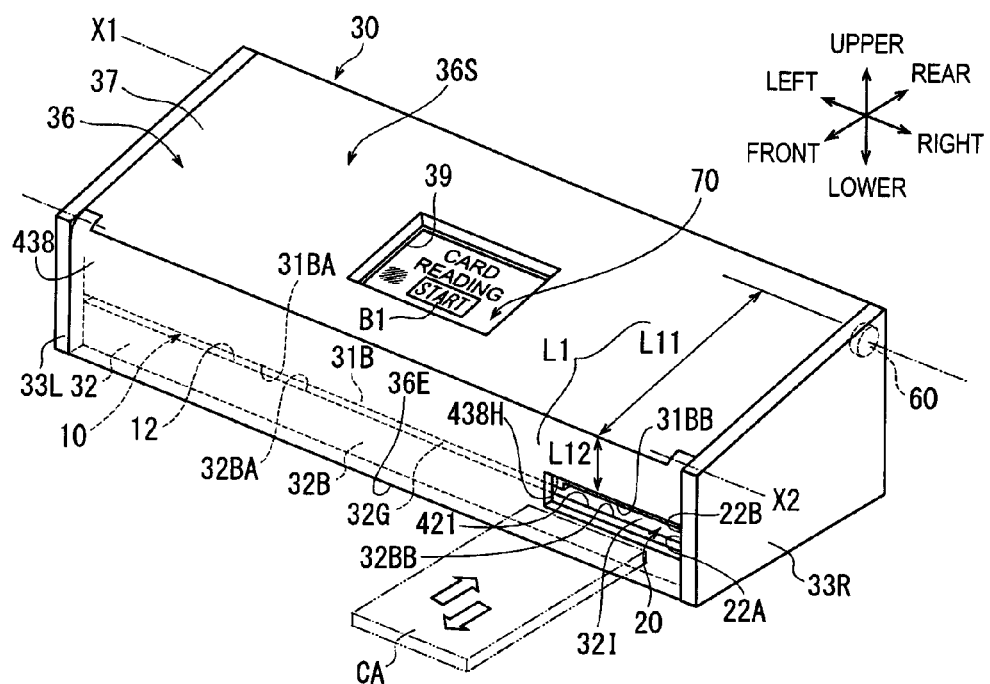
FIG. 10 is a front perspective view illustrating an image reading apparatus according to a third illustrative configuration.
Figure 11:
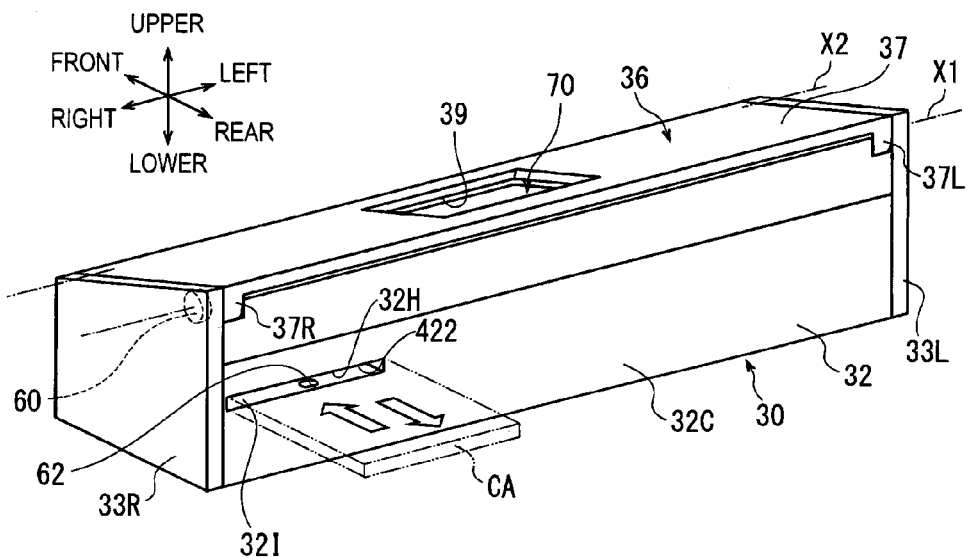
FIG. 11 is a rear perspective view illustrating the image reading apparatus according to the third illustrative configuration.

As shown in FIGS. 10 and 11, according to an image reading apparatus of a third illustrative configuration, the second discharge opening 22 of the image reading apparatus 1 of the first illustrative configuration is changed into a second introduction/discharge opening 421, and the second introduction opening 21 of the image reading apparatus 1 of the first illustrative configuration is changed into an intermediate discharge opening 422. Also, the second tray 38 of the image reading apparatus 1 of the first illustrative configuration is changed into a second tray 438. The other configurations of the third illustrative configuration are the same as those of the first illustrative configuration. Thus, the same elements as those of the first illustrative configuration are indicated with the same reference numerals and the descriptions thereof are omitted or simplified.

The second introduction/discharge opening 421 has the same shape as the second discharge opening 22 of the first illustrative configuration. The second introduction/discharge opening 421 is used in common with a part of the right side of the first discharge opening 12. The intermediate discharge opening 422 has the same shape as the second introduction opening 21 of the first illustrative configuration.

Like the second tray 38 of the first illustrative configuration, the second tray 438 does not cover the second introduction/discharge opening 421, which is used in common with a part of a side of the right side of the first discharge opening 12, at the state where the feeding tray 36 is located at the close position. However, the second tray 438 covers a left part of the first discharge opening 12 from the front at the state where the feeding tray 36 is located at the close position. An opening 438H is formed at a right part of the second tray 438. The opening 438H overlaps with the second introduction/discharge opening 421 in the front-rear direction at the state where the feeding tray 36 is located at the close position. Thereby, the user can easily know that it is possible to read the card CA at the state where the feeding tray 36 is located at the close position. Also, since the second tray 438 can cover the left part of the first discharge opening 12 in the front-rear direction at the state where the feeding tray 36 is located at the close position, it is possible to suppress foreign materials from being introduced into the housing 30 from the left part of the first discharge opening 12.

The card CA is introduced into the second introduction/discharge opening 421. The conveyance unit 40 conveys rearwards the card CA on the second conveyance path 20. The rearward conveyance of the card CA is executed as the CPU 54A of the control circuit 54 enables the conveyance unit 40 to perform a counter conveyance in an opposite direction to the rotating direction of the conveyance unit 40 of the first illustrative configuration. Then, the card CA is partially discharged to the outside of the housing 30 from the intermediate discharge opening 422. That is, the card CA is conveyed rearwards by the conveyance unit 40 until the card reaches the start position. Then, the conveyance unit 40 conveys forwards the card CA on the second conveyance path 20. At this time, after the images of the card CA are read by the image reading sensors 55A, 55B, the card CA is discharged to the outside of the housing 30 through the second introduction/discharge opening 421.

The image reading apparatus of the third illustrative configuration can also realize the same operational effects as those of the image reading apparatus 1 of the first illustrative configuration.

(Fourth Illustrative Configuration)

Figure 12:
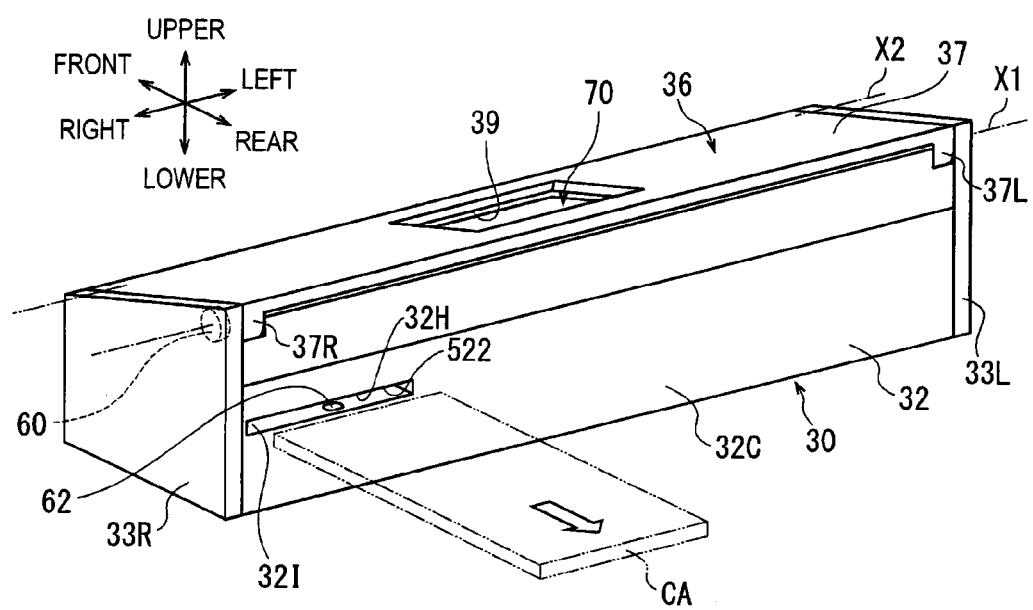
FIG. 12 is a rear perspective view illustrating an image reading apparatus according to a fourth illustrative configuration.

As shown in FIG. 12, according to an image reading apparatus of a fourth illustrative configuration, the second discharge opening 22 of the image reading apparatus 1 of the first illustrative configuration is changed into a second introduction opening into which the card CA is introduced, and the second introduction opening 21 of the image reading apparatus 1 of the first illustrative configuration is changed into a second discharge opening 522 through which the card CA is discharged. The other elements of the fourth illustrative configuration are the same as those of the first illustrative configuration. Thus, the same elements as those of the first illustrative configuration are indicated with the same reference numerals and the descriptions thereof are omitted or simplified.

Like the second introduction/discharge opening 421 of the third illustrative configuration, the second introduction opening of the fourth illustrative configuration has the same shape as the second discharge opening 22 of the first illustrative configuration. Thus, the second introduction opening is not shown. The second discharge opening 522 has the same shape as the second introduction opening 21 of the first illustrative configuration.

The card CA is introduced into the second introduction opening. The conveyance unit 40 conveys rearwards the card CA on the second conveyance path 20. Then, after the images of the card CA are read by the image reading sensors 55A, 55B, the card CA is discharged to the outside of the housing 30 through the second discharge opening 522.

The image reading apparatus of the fourth illustrative configuration can also realize the same operational effects as those of the image reading apparatus 1 of the first illustrative configuration.

Although this disclosure has been described on the basis of the first to fourth illustrative configurations, this disclosure is not limited to the first to fourth illustrative configurations and can be appropriately changed and applied without departing from the gist thereof.

In the first illustrative configuration, the feeding tray 36 is configured so that it can be rotated about the rotation axis X1 between the open position and the close position relative to the housing 30. However, this disclosure is not limited to the configuration. For example, the feeding tray may be configured to slide between the open position and the close position relative to the housing 30.

In the first illustrative configuration, the touch panel 70 is directly contacted through the operation opening 39. However, this disclosure is not limited to the configuration. For example, the operation opening 39 may be provided with a transparent film. In this case, the user operates the touch panel 70 via the film at the state where the feeding tray 36 is located at the close position.

For example, the touch panel 70 of the first illustrative configuration may be changed into a panel having a display function only and the operation opening 39 may be provided with a transparent contact detection film, which may be enabled to function as the operation device of this disclosure.

The operation device of this disclosure is not limited to the touch panel 70 of the first illustrative configuration and may be an electrostatic capacity type button or key and the like. Also, the operation device of this disclosure may be an information terminal such as smart phone that is connected in information communication with the image reading apparatus of this disclosure by a wired or wireless scheme.

In the first illustrative configuration, the front end edge 36E of the feeding tray 36 is positioned above the first discharge opening 12 and the second discharge opening 22. However, this disclosure is not limited to the configuration. For example, it may be possible that the front end edge of the feeding tray extends up to a vicinity of a mounting surface of the image reading apparatus, the feeding tray covers a part of the first discharge opening, only a periphery of the second discharge opening of the feeding tray is formed with a through-hole or notch and the feeding tray does not cover the second discharge opening.

In the first illustrative configuration, when the card sensor 62 detects in steps S102, S103 of FIG. 8 that there is the card CA in the second introduction opening 21, the instruction to read the card CA is received from the touch panel 70. However, this disclosure is not limited to the configuration. For example, a following configuration may be possible. That is, at the state where the feeding tray 36 is located at the close position, when the instruction to read the card CA is received from the touch panel 70, irrespective of whether there is the card CA in the second introduction opening 21, the driving motor 40M of the conveyance unit 40 is driven to rotate the conveyance rollers 42A, 42B, 42C.

This disclosure can be applied to an image reading apparatus, a complex machine and the like.

What is claimed is:

1. An image reading apparatus comprising:
   a housing defining:
   a first introduction opening having a first length in a first direction;
   a first discharge opening;
   a second introduction opening having a second length in the first direction, the second length being shorter than the first length; and
   a second discharge opening;
   a tray configured to connect to the housing movably between an open position and a close position relative to the housing, the tray being configured to receive the a medium at the open position, and the tray being configured to cover the first introduction opening and to expose the second introduction opening and the second discharge opening at the close position;
   a conveyer configured to convey a second medium from the second introduction opening to the second discharge opening, the conveyer being provided in the housing;
   an image reader configured to read an image of the first medium conveyed from the first introduction opening to the first discharge opening and to read an image of the second medium conveyed from the second introduction opening to the second discharge opening, the image reader being provided in the housing;
   a position detector configured to detect a position of the tray relative to the housing; and
   a controller configured to determine whether the tray is located at the close position based on the detection result received from the position detector, the controller being configured to drive the conveyer when the controller has determined that the tray is located at the close position.

2. The image reading apparatus according to claim 1, further comprising
   a medium detector configured to detect the second medium in the second introduction opening,
   wherein the controller is further configured to drive the conveyer in response to a detection of the second medium by the medium detector.

3. The image reading apparatus according to claim 2, wherein the controller is further configured to:
   switch the image reading apparatus into a low power consumption state; and
   release the low power consumption state in response to the detection of the second medium by the medium detector.

4. The image reading apparatus according to claim 1, further comprising
   an operation device configured to receive an operation,
   wherein the controller is further configured to drive the conveyer in response to reception of an operation by the operation device, the operation indicating a conveyance start instruction of the second medium.

5. The image reading apparatus according to claim 4,
   wherein the operation device is provided on one surface of the housing,
   wherein the tray is configured to cover the one surface of the housing at the close position, and
   wherein the tray has defines an opening above the operation device when the tray is located at the close position.

6. The image reading apparatus according to claim 1,
   wherein the tray is configured to rotate about a rotation axis between the open position and the close position,
   wherein the tray comprises a first tray and a second tray, one side of the first tray is configured to connect to the housing rotatably about the rotation axis, and one side of the second tray is configured to connect to the other side of the first tray rotatably about another rotation axis,
   wherein the first discharge opening and at least one of the second introduction opening and the second discharge opening are provided at an opposite side to the rotation axis with respect to the reading unit in a conveyance direction of the second medium, and
   wherein, when the tray is located at the close position, the first tray is configured to cover the first introduction opening and the second tray is configured to expose the at least one of the second introduction opening and the second discharge opening.

7. The image reading apparatus according to claim 6, wherein
   the second tray is configured to be positioned at an upper side of the at least one of the second introduction opening and the second discharge opening when the tray is located at the close position.

8. The image reading apparatus according to claim 6, wherein
   the second tray is configured to cover the first discharge opening when the tray is located at the close position.

9. The image reading apparatus according to claim 1,
   wherein the first introduction opening and the second introduction opening are positioned at the same side with respect to the reading unit in a conveyance direction of the second medium, and
   wherein the first discharge opening and the second discharge opening are positioned at an opposite side to the first introduction opening and the second introduction opening with respect to the reading unit in the conveyance direction of the second medium.

10. The image reading apparatus according to claim 1, wherein the housing further defines:
    a first conveyance path between the first introduction opening and the first discharge opening; and
    a second conveyance path between the second introduction opening and the second discharge opening, a portion of the second conveyance path overlapping with a portion of the first conveyance path.

11. The image reading apparatus according to claim 1, wherein
    the controller is further configured not to drive the conveyer when the controller has determined that the tray is located at the open position.

12. An image reading apparatus comprising:
    a housing defining:
      a first introduction opening having a first length in a first direction;
      a first discharge opening;
      a second introduction opening having a second length in the first direction, the second length being shorter than the first length; and
      a second discharge opening;
    a conveyer provided in the housing;
    an image reader provided in the housing; and
    a tray configured to connect to the housing rotatably about a rotation axis relative to the housing between an open position and a close position and comprising:
      a first tray configured to connect to the housing rotatably about the rotation axis at one side of the first tray, the first tray being configured to receive a medium when the tray is located at the open position, the first tray being configured to cover the first introduction opening when the tray is located at the close position; and
      a second tray configured to connect to the other side of the first tray rotatably about another rotation axis, the second tray being configured to receive the medium when the tray is located at the open position, the second tray being configured to expose the at least one of the second introduction opening and the second discharge opening when the tray is located at the close position.

13. The image reading apparatus according to claim 12, wherein the second tray is configured to be positioned at a upper side of the at least one of the second introduction opening and the second discharge opening when the tray is located at the close position.

14. The image reading apparatus according to claim 13, wherein
    the second tray is configured to cover the first discharge opening when the tray is located at the close position.

15. An image reading apparatus comprising:
    a housing defining:
      a first introduction opening having a first length in a first direction;
      a first discharge opening;
      a second introduction opening having a second length in the first direction, the second length being shorter than the first length; and
      a second discharge opening;
    a conveyer provided in the housing;
    an image reader provided in the housing;
    an operation device provided on one surface of the housing; and
    a tray configured to connect to the housing movably between an open position and a close position relative to the housing, the tray being configured to cover the first introduction opening and the one surface of the housing when the tray is located at the close position, and the tray defining an opening above the operation device when the tray is located at the close position.

16. The image reading apparatus according to claim 15, wherein the operation device is configured to receive an operation, and wherein the conveyer is configured to convey a medium from the second introduction opening to the second discharge opening in response to reception of an operation by the operation device, the operation indicating a conveyance start instruction of the second medium.

17. The image reading apparatus according to claim 12, further comprises an operation device provided on one surface of the housing, wherein the first tray is configured to cover the one surface of the housing at the close position, and wherein the first tray defines an opening above the operation device when the tray is located at the close position.

18. The image reading apparatus according to claim 12, wherein the first introduction opening and the second introduction opening are positioned at the same side with respect to the reading unit in a conveyance direction of the second medium, and wherein the first discharge opening and the second discharge opening are positioned at an opposite side to the first introduction opening and the second introduction opening with respect to the reading unit in the conveyance direction of the second medium.

19. The image reading apparatus according to claim 15, wherein the tray is configured to expose the second introduction opening and the second discharge opening when the tray is located at the close position.

20. The image reading apparatus according to claim 15, wherein the first introduction opening and the second introduction opening are positioned at the same side with respect to the reading unit in a conveyance direction of the second medium, and wherein the first discharge opening and the second discharge opening are positioned at an opposite side to the first introduction opening and the second introduction opening with respect to the reading unit in the conveyance direction of the second medium.

* * * * *